United States Patent
Tang

(10) Patent No.: US 8,196,152 B2
(45) Date of Patent: Jun. 5, 2012

(54) CONTAINER CONTEXT INFORMATION PROPAGATION IN AN ASPECT-ORIENTED ENVIRONMENT

(75) Inventor: Jian Tang, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1079 days.

(21) Appl. No.: 12/107,401

(22) Filed: Apr. 22, 2008

(65) Prior Publication Data

US 2009/0265717 A1  Oct. 22, 2009

(51) Int. Cl.
- G06F 13/00 (2006.01)
- G06F 9/46 (2006.01)
- G06F 9/44 (2006.01)

(52) U.S. Cl. ......... 719/316; 718/100; 717/110; 717/120

(58) Field of Classification Search .................. None
See application file for complete search history.

(56) References Cited

U.S. PATENT DOCUMENTS 7,206,807 B2 * 4/2007 Cheenath ............... 709/203

OTHER PUBLICATIONS

Volter, "A Generative Component Infrastructure for Embedded Systems", Jan. 16, 2003, version 1.2, pp. 1-9.*
Ebraert, "Tool Support for Partial Behavioral Reflection", 2003, pp. 1-96.*

* cited by examiner

*Primary Examiner* — S. Sough
*Assistant Examiner* — Phuong Hoang
(74) *Attorney, Agent, or Firm* — Toler Law Group

(57) ABSTRACT

A service context associated with a container is pushed to a thread executing an asynchronous aspect outside of the container. A thread may be initiated outside of the container to asynchronously run the aspect. The service context(s) associated with the container may be communicated to the thread executing the aspect outside the container. In this manner, the aspect may execute outside of the container for increased efficiency for considerations, while having access to resources by virtue of the service contexts passed on from the container.

20 Claims, 2 Drawing Sheets

CONTAINER CONTEXT INFORMATION PROPAGATION IN AN ASPECT-ORIENTED ENVIRONMENT

FIELD OF THE INVENTION

The present invention relates generally to computer programming applications, and more particularly, to program development and execution within an aspect-oriented computer environment.

BACKGROUND OF THE INVENTION

Object-oriented programming enables developers to visualize programmatic systems as groups and interactions of entities. To assist in this visualization, the programming paradigm includes a collection of virtual objects. Objects comprise both data structures and operations, known collectively as methods. Methods access and manipulate data structures. Objects having identical data structures and common behavior can be grouped together into classes. Each object inherits the data structure and methods of the particular class from which it was instantiated. Further, a hierarchical inheritance relationship exists between multiple classes. Each object can receive messages, process data, and send messages to other objects. Each object can be seen as an independent mechanism with a distinct role or responsibility.

Aspect-oriented programming enables methods to cross-communicate. More particularly, aspect-oriented programming allows programmers to use abstraction and decomposition to break apart large problems into smaller, more manageable subparts. Aspects facilitate the talking among methods. An aspect may comprise a portion of program code that can be woven across multiple program code points.

In one example, aspect-oriented programming may be used in a funds transfer application. A fund transfer program is composed of codes that execute SQL statements to transfer a remittance amount from a remittance account to a receiving account, when the remittance account, the receiving account and the remittance amount are entered. For the fund transfer, a user's computer must be checked if an anti-hacking program is loaded, and the user must be authenticated as a valid user. Further, it must be checked that the counterpart bank has properly processed the fund transfer, and the details of the fund transfer must be logged on the system. That is, in order to process a fund transfer, not only the fund transfer function, but also the additional functions such as security, authentication and log functions must be implemented at the same time. The codes for the additional functions are coded in a variety of programs, which are scattered over the system, other than the fund transfer programs. Here, the implementing functions (i.e., fund transfer) are the core concerns, while the additional functions (i.e., security/authentication/log) are the cross-cutting concerns.

In the absence of aspect-oriented programming, a programmer wishing to insert, modify, replace, or delete a portion of code with primary or cross-cutting concerns implemented therein must find out and modify all the codes of the programs scattered over the system by hand, one by one. That is, since both the core and cross-cutting concerns are implemented in one program in this method, the readability of the program is decreased, making modification of the code difficult. Accordingly, the development and maintenance of a program cannot be easily accomplished.

Aspect-oriented programming was developed to address this problem. Namely, aspect-oriented programming defines a methodology that deals with cross-cutting concerns. In aspect-oriented programming, one program is developed using the codes that implement cross-cutting concerns, and another program is developed using the codes that implement core concerns. The aspect-oriented programming describes the specifications for weaving the two programs using the point cut information. A program using the aspect-oriented programming methodology is referred to as an aspect, while a program using a conventional programming methodology is referred to as a base program. Here, the point cut is the information on the location of a base program, or application, where a specific code fragment of an aspect program is inserted.

Essentially, aspect-oriented programming allows the introduction of new functionality into objects without the objects' needing to have any knowledge of that introduction. AspectJ is an example familiar to those skilled in the art of aspect-oriented programming. AspectJ is a simple and practical aspect-oriented extension to Java. With just a few new constructs, AspectJ provides support for modular implementation of a range of crosscutting concerns. In AspectJ's dynamic join point model, code is compiled into standard Java bytecode. Simple extensions to existing Java development environments make it possible to browse the crosscutting structure of aspects in the same kind of way as one browses the inheritance structure of classes.

AspectJ allows programmers to define special constructs called aspects. Aspects can include several entities unavailable to standard classes. For instance, inter-type declarations allow a programmer to add methods, fields, or interfaces to existing classes from within the aspect. Pointcuts allow a programmer to specify join points (well-defined moments in the execution of a program, like method call, object instantiation, or variable access). Pointcuts are expressions (quantifications) that determine whether a given join point matches. Advice comprises an aspect-oriented programming feature that allows a programmer to specify code to run at a join point matched by a pointcut. The actions can be performed before, after, or around the specified join point. Traditionally, the aspects of AspectJ and other aspect-oriented programming languages run on application threads (short for thread of execution: a way for a program to split itself into two or more simultaneously running tasks) inside an application container.

An application container refers to a software engine that hosts applications to clients. Application containers offer infrastructure for applications that include fundamental features, such as security, transaction, data access, naming services, etc. Therefore, the applications can focus on business logics.

When an application is executed within a container, it is executed with service contexts provided by the application container. These service contexts represent the security service, naming service, transaction service, resource management service, to name a few. During the execution, the container automatically establishes these service contexts on the application thread for applications to use based on the environment and the deployment information. In one application, for instance, established context information comprising service contexts may include contextual information of a request that is evaluated to determine if access to a resource should be allowed.

Traditional aspects run in the same thread as the above mentioned base programs. However, some products, for example, the JBoss aspect-oriented programming language, have adopted asynchronous aspects to asynchronously invoke a thread to run the aspect outside of the application container. This can improve the performance of the base programs in a multi-threaded environment by not holding the base application thread.

When an aspect is run asynchronously outside of a container, another thread must be initialized for the aspect. Because the new thread is started outside the application container, the new thread cannot access the service contexts of the container. The application loses all the service contexts associated with the thread that the base program was running. Consequently, commercial applications that have adopted running aspects asynchronously are limited to logging, tracing, or auditing operations. That is, there is no effective way of asynchronously running an aspect outside of a container in a manner that accesses service contexts.

Therefore, what is needed is a way for an aspect to run outside of an application container without losing all of the service contexts associated with the thread that the base program is running.

SUMMARY OF THE INVENTION

Embodiments of the present invention provide an improved computer implemented method, apparatus and program product for managing access to a resource within an aspect-oriented environment by using a thread to execute an application within a container, initializing another thread to execute an aspect outside of the container and communicating to the other thread a context code enabling access to a resource by the aspect. In one embodiment, the context code relates to a security service, a transaction service or a naming service associated with the container. The aspect may execute asynchronously, and the application may comprise a base program.

According to one embodiment that is consistent with the invention, the other thread may initialize the aspect using at least one of a programming language command, an XML configuration and a metadata annotation. As such, the aspect may be associated with a command code configured to enable communication of the context code. Aspects of the invention may automatically identify the command code. Where so configured, the other thread may be assigned to the aspect. The context code may be retrieved, e.g., from the container. The aspect may establish the service context while executing asynchronously.

These and other advantages and features that characterize the invention are set forth in the claims annexed hereto and forming a further part hereof. However, for a better understanding of the invention, and of the advantages and objectives attained through its use, reference should be made to the Drawings and to the accompanying descriptive matter in which there are described exemplary embodiments of the invention.

DETAILED DESCRIPTION

Figure 1:
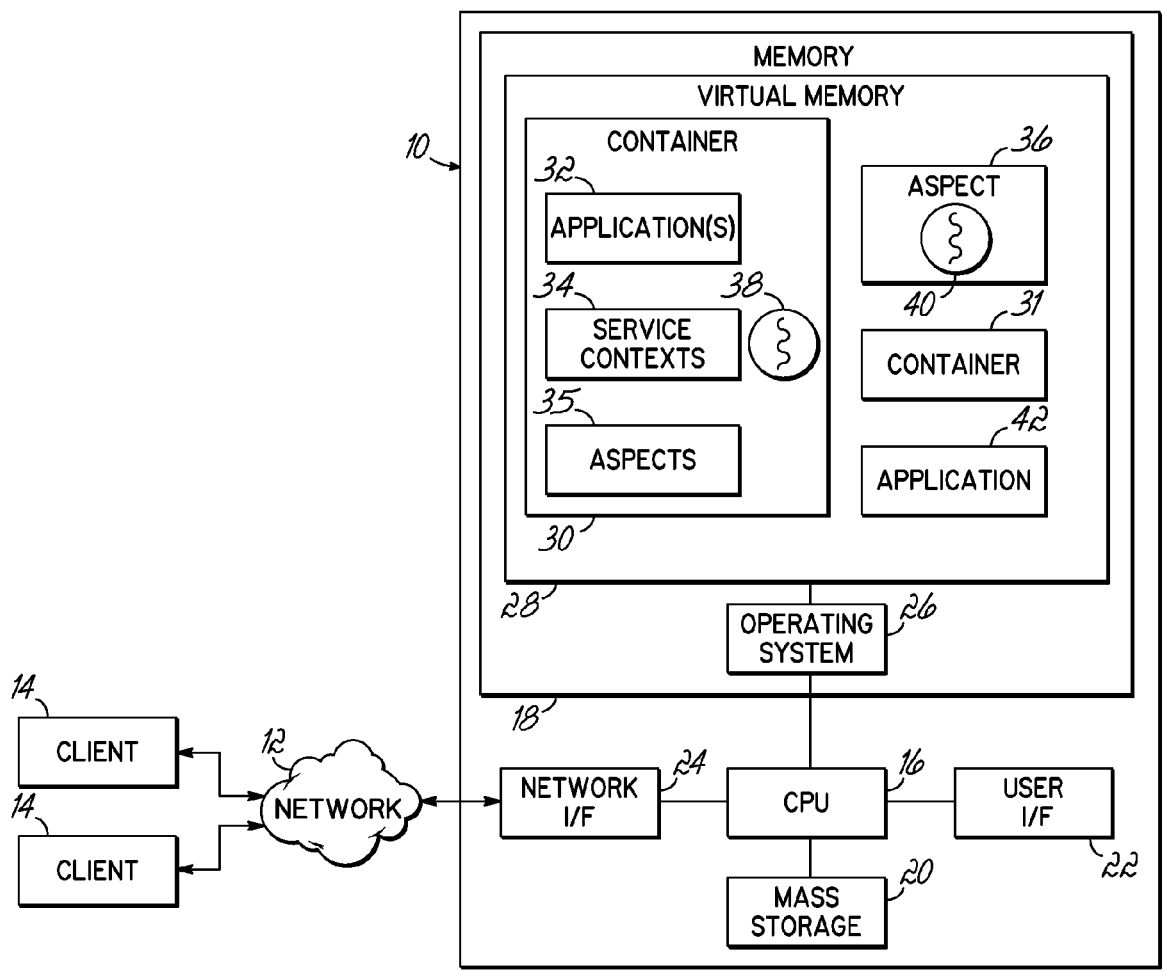
FIG. 1 shows a block diagram of a computer system configured to service context information propagation in a manner that is consistent with the principles of the present invention.

Embodiments consistent with the underlying principles of the present invention enable a service context associated with a container to be pushed to a thread executing an asynchronous aspect outside of the container. The thread may be initiated outside of the container to asynchronously run the aspect. The service context(s) associated with the container may be communicated to the thread executing the aspect outside the container. In this manner, the aspect may execute outside of the container for increased efficiency considerations, while having access to resources by virtue of the service contexts passed on from the container.

Aspects of the invention thus address the problem of the aspect running outside of the container being unable to access services in the container. At runtime, service contexts may be pushed to the aspect thread so service contexts can be accessed, and the container is enabled to access resources related to the container.

Embodiments consistent with underlying principals of the present invention may provide an aspect construct, or concept. For instance, an exemplary aspect designation may include "AsyncServerAspect". The AsyncServerAspect may include an aspect that is executed asynchronously and is capable of establishing the service context. When an aspect is programmatically specified or otherwise associated with AsyncServerAspect in an application container, the execution of the aspect may be invoked asynchronously in a different thread. As such, embodiments may invoke aspect execution asynchronously with a thread other than what is executing in the application container. Service contexts may be transferred, propagated or otherwise communicated to the asynchronous thread so that the thread may utilize the services provided by the application container. Embodiments consistent with the invention may thus provide service context support for the asynchronous aspect.

Service contexts typically regard services that include security, transaction and naming services associated with the container. A service context may comprise an object, and may be integral and transferable across different threads. As such, the service context may be designed to support the retrieval and establishment on an application container thread. The service context objects may be transferable in a number of ways that may depend upon the implementation of an applicable container.

Conventionally, service contexts are handled by developers by manually retrieving the service contexts from the container and establishing the contexts, themselves. In some cases, the user cannot access the context. This is often the case where service contexts are created, maintained and evolved by the application container. In such cases, the application container generally does not expose them to users for safety, maintenance and deprecation considerations.

Embodiments consistent with the invention may retrieve and establish a service context written by the application container or an aspect provider that supports the application container. As such, the service contexts are generally not written by users. This feature avoids the tedious and sometimes impossible burden previously relegated to developers. Embodiments may retrieve and establish threads and specific contexts. In an application container such as an application server, each thread may have its own contexts. As discussed herein, such contexts typically include security, naming, data source and transaction features.

Embodiments consistent with the invention may thus regard how service contexts are retrieved and pushed to a new thread. The application container thread (thread executing the container) may provide a mechanism to retrieve all the appropriate service context objects. Before creating the aspect thread (the thread executing the aspect), the service contexts to be associated with the aspect thread may be retrieved. After creating the aspect thread, the service context may be established to the aspect thread.

The aspect may be written in conformance with known programming languages. No service contexts are needed, so the aspect may be written in similar or identical fashion as is an aspect written for an application running in a stand alone mode (not in a container). Embodiments consistent with the invention may use AsyncServerAspect in the place of code generally comprising a generic aspect definition. The responsibility of retrieving/establishing contexts may be hidden and transparent to a user. The retrieval/establishment may be written by the application container or the aspect provider that supports the application container.

As discussed herein, a language keyword AsyncServerAspect may be provided to users. Instead of defining an aspect as "public aspect LogAction", programmers may define an aspect as "public AsyncServerAspect LogAction". Other mechanisms may be used so new language keyword is unneeded. For example, extensible markup language (XML) may be used to specify the aspect as an AsyncServerAspect aspect: "<aspect class="com.acme.aspects.LogAction" type="ASYNC_ SERVER"/>"

Aspect weaving may inject the program code to retrieve and establish the service contexts in the thread to invoke the aspect. For example, if the above "LogAction" aspect is defined to be invoked after the method, "Transaction.executeAction(*)", then exemplary woven program code may include:

```
class Transaction {
public void executeAction ( ) {
// User's code to execute action.
    ...
// after the action is being executed, we log the action.
AsyncAspectThread asyncAspect = new AsyncAspectThread( );
// Initialize the aspect data.
    ...
// retrieve the service contexts and establish on the newly created
aspect thread.
Service Context[ ] contexts = retrieveServiceContexts( );
asynAspect.push(contexts);
// run the aspect asynchronously
asyncAspect.start( );
    }
}
```

In the italicized statements shown above, exemplary code may specifically enable service context awareness. In this manner, embodiments provide an extended type of aspect that is useful when running in an application container. Embodiments may free the user's burden of handling and managing such service contexts manually.

Turning now to the Drawings, wherein like numbers denote like parts throughout the several views, FIG. 1 illustrates an exemplary apparatus, or a computer system 10, within which a service context may be pushed to an asynchronously executing aspect. Put another way, FIG. 1 shows a block diagram of a computer system configured to service context information propagation in a manner that is consistent with the principles of the present invention.

The computer system 10 in the illustrated embodiment is implemented as a server or multi-user computer system that is coupled via a network 12 to one or more client computers 14.

For the purposes of the illustrated embodiment, each computer system 10, 14 may represent practically any type of computer, computer system or other programmable electronic device. Moreover, each computer system 10, 14 may be implemented using one or more networked computers, e.g., in a cluster or other distributed computing system.

In the alternative, aspect-oriented environments consistent with the invention may be implemented within a single computer or other programmable electronic device, such as a desktop computer, a laptop computer, a handheld computer, a cell phone, a set top box, a non-networked, standalone configuration, etc. In the embodiment of FIG. 1, the computer system 10 is consistent with the type of processing system exemplified in the WebSphere Application Server available from International Business Machines Corp.

The computer system 10 typically comprises a central processing unit 16 that includes at least one microprocessor coupled to a memory 18. Memory 18 may represent the random access memory (RAM) devices comprising the main storage of the computer system 10, as well as any supplemental levels of memory: cache memories, non-volatile or backup memories (programmable or flash memories), read-only memories, etc. In addition, memory 18 may be considered to include memory storage physically located elsewhere in the computer system 10, e.g., any cache memory in a processor in CPU 16, as well as any storage capacity used as a virtual memory, as stored on a mass storage device 20 or on another computer coupled to the computer system 10.

The computer system 10 also typically receives a number of inputs and outputs for communicating information externally. For interface with a user or operator, the computer system 10 typically includes a user interface 22 incorporating one or more user input devices (e.g., a keyboard, a mouse, a trackball, a joystick, a touchpad, and/or a microphone, etc.) and a display (e.g., a CRT monitor, an LCD display panel, and/or a speaker, etc.) Otherwise, user input may be received via another computer or terminal.

For additional storage, the computer system 10 may also include one or more mass storage devices 20, such as a floppy or other removable disk drive, a hard disk drive, a direct access storage device (DASD), an optical drive (a CD drive, a DVD drive, etc.), and/or a tape drive, among others. Furthermore, the computer system 10 may include an interface 24 with one or more networks 12 (e.g., a LAN, a WAN, a wireless network, and/or the Internet, and so on) to permit the communication of information with other computers and electronic devices. It should be appreciated that the computer system 10 typically includes suitable analog and/or digital interfaces between CPU 16 and each of components 18, 20, 22 and 24, as is well known in the art. Other hardware environments are contemplated within the context of the invention.

The computer system 10 operates under the control of an operating system 26 and executes or otherwise relies upon various computer software applications, components, programs, objects, modules, data structures, etc., as will be described in greater detail below. Moreover, various applications, components, programs, objects, modules, etc. may also execute on one or more processors in another computer coupled to the computer system 10 via network 12, e.g., in a distributed or client-server computing environment, whereby the processing required to implement the functions of a computer program may be allocated to multiple computers over a network.

Virtual memory 28 includes containers 30, 31. The application containers 30, 31 may include software engines that host applications 32 to clients. Put another way, the application container 30 is where a user may deploy an application 32 to execute. The application container 30 may include a managed environment where the application 32 has certain services available to it, such as connection management and transaction management. Depending on how the managed environment is defined, the application 32 may have varying granularity, such as at the component level. An application container 30 may offer infrastructure for such applications 32. This infrastructure may include service contexts 34, as shown in FIG. 1.

As discussed herein, service contexts 34 may include data that jobs and tasks work on, or the input and output parameter of any provider method. Service contexts 34 and other context code may define a relationship between a service provider (e.g., an aspect or container) and the related data. That is, context code generally enables access to a resource. In one application, the service provider's vocabulary may define the objects and also the relationship between the objects of the service provider according to a specified domain of interest. For an exertion to be satisfied by a service provider from a service requester, the requestor has to satisfy or comply with the ontology of the service provider.

The container 30 may have one or more threads 38 for execution of its processes. Threads 38 enable a program to divide its processing into two or more concurrently running tasks.

Virtual memory 28 may also include aspects 35, 36. An aspect 36 may run outside of the container 30 for efficiency considerations. The aspect 36 may be executed by or may otherwise have its own thread 40, which likewise executes outside of the container 30.

The aspect 36 may include a plain Java class that encapsulates any number of advices and pointcut definitions. An advice is a method that is called when a particular join point is executed, i.e., the behavior that is triggered when a method is called. An advice may be thought of as the code that does the interception, or as an event handler. The pointcut expression matches a particular join point. The join point comprises a point in the control flow of a program. A join point includes where the main program and the aspect meet. Crosscutting facilitated by such aspects improves the relatively isolated blocks of code that can slow the execution of conventional object-oriented programming code. Aspect-oriented features in accordance with embodiments of the invention thus provide additional flexibility to accommodate changes in requirements.

In general, the routines executed to implement the embodiments of the invention, whether implemented as part of an operating system or a specific application, component, program, object, module or sequence of instructions, or even a subset thereof, will be referred to herein as "algorithms," "program code," or simply "programs." Program code typically comprises one or more instructions that are resident at various times in various memory and storage devices in a computer; when read and executed by one or more processors in a computer they cause that computer to perform the steps necessary to execute steps or elements embodying the various aspects of the invention.

Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media comprise, but are not limited to tangible, recordable type media and transmission type media. Examples of tangible, recordable type media include volatile and non-volatile memory devices, floppy and other removable disks, hard disk drives, magnetic tape, and optical disks (CD-ROMs, DVDs, etc.). Examples of transmission type media include digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature.

Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Figures 2, 3:
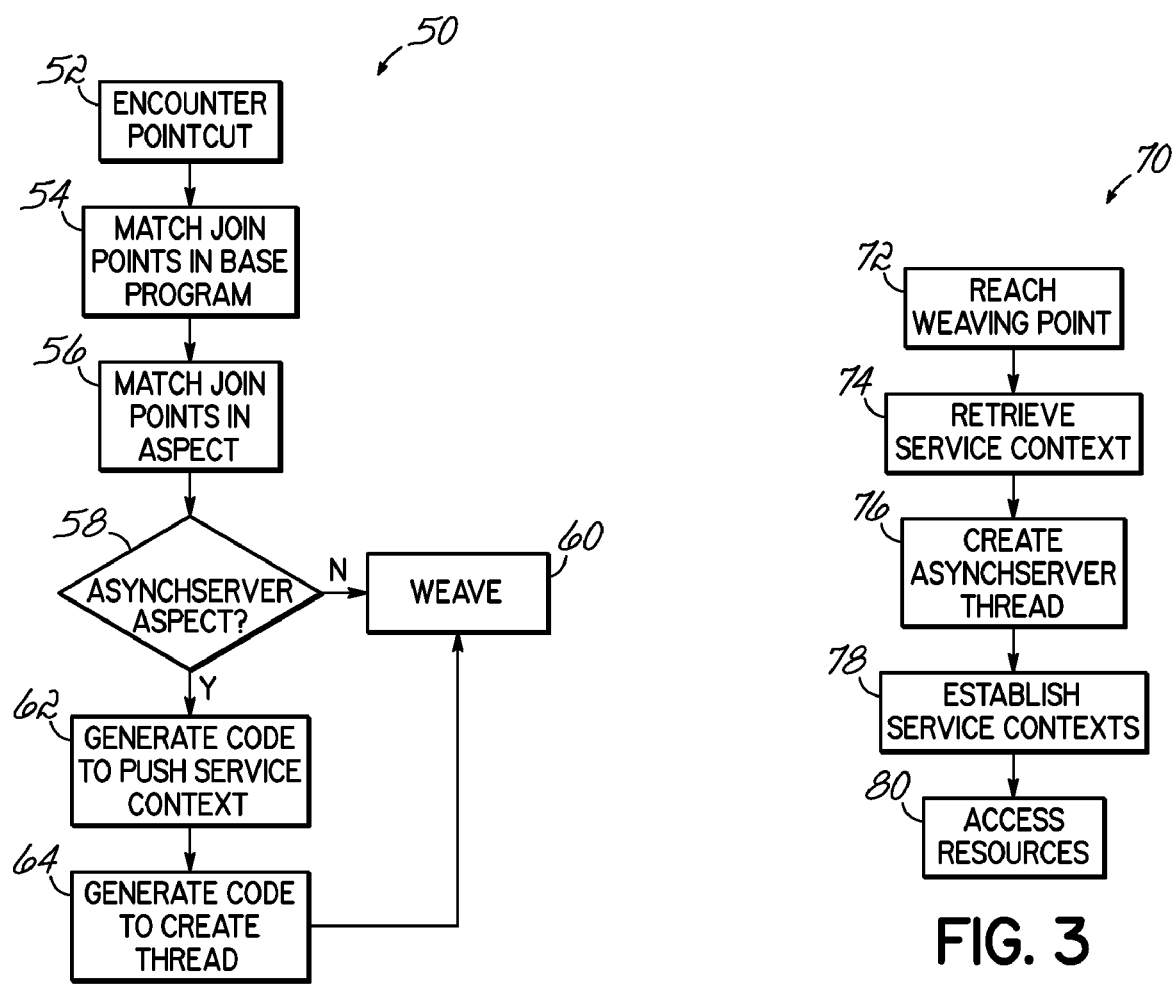
FIG. 2 shows a flowchart having steps executable by the system of FIG. 1 for compiling program code for propagating service context information in accordance with the principles of the present invention.
FIG. 3 shows a flowchart having steps executable by the system of FIG. 1 for running program code for propagating service context information in accordance with the principles of the present invention.

FIG. 2 shows a flowchart 50 having steps executable by the system 10 of FIG. 1 for compiling program code for propagating service context information 34 in accordance with the principles of the present invention. In one sense, the flowchart 50 includes steps for compiling an asynchronous server thread aspect 36.

Turning more particularly to the process shown in the flowchart 50, the system 10 may encounter at block 52 a pointcut during compilation. Pointcuts include expressions (quantifications) that determine whether a given join point matches. A pointcut may comprise a set of join points. Whenever a program execution reaches one of the join points described in the pointcut, the piece of code associated with the pointcut called advice may be executed. This may allow a programmer to describe where and when additional code may be executed in addition to an already defined behavior. This permits the addition of aspects to existing software, or the design of software with a clear separation of concerns, wherein the program weaves or otherwise merges different aspects into a complete application.

At block 54, the system 10 may find matching join points in a base program. The join points may comprise well-defined moments in the execution of a program/application 32, like method calls, object instantiations, or variable accesses. The join points comprise locations in the control flow of an application 32. A join point is where the main program/application and the aspect 36 meet.

The system 10 may locate at block 56 matching join points in the aspect program.

At block 58, the system 10 may determine whether an AsyncServer aspect is involved. If not, then the system 10 may weave the aspect as normal at block 60.

Alternatively, the system 10 may generate at block 62 code to push the applicable service context based on the applicable container specifications.

At block 64 of FIG. 2, the system 10 may generate code to create an AsyncAspect thread 40.

The system 10 may weave the aspect at block 60 towards concluding the compilation processes. The aspect weaving may inject the code to retrieve and establish the service context 34 in the thread 40. As such, the thread 40 may invoke the aspect 36.

FIG. 3 shows a flowchart 70 having steps executable by the system of FIG. 1 for running program code for propagating service context information in accordance with the principles of the present invention. In one sense, the flowchart 70 of FIG. 3 includes steps executable by the system 10 during runtime.

Turning more particularly to the steps of the flowchart 70, the system 10 may determine at block 72 that the program/application 32 has reached an aspect weaving point. At block 74 of FIG. 3, the service context 34 associated with the applicable thread 40 may be retrieved using processes specific to the appropriate container 30.

The system 10 may create at block 76 an AsyncServer thread 40. The service context 34 may be established at block 78 to the aspect thread 40 in the manner consistent with and specific to the container 30.

The AsyncServer thread 40 may execute at block 80. Because the AsyncServer thread 40 has access to all applicable server contexts 34, the thread 40 may access all needed server resources at block 80.

While the present invention has been illustrated by a description of various embodiments and while these embodiments have been described in considerable detail, it is not the intention of the Applicant to restrict, or, in any way limit the scope of the appended claims to such detail. For instance, while embodiments of the invention complement AspectJ operations, embodiments have equal applicability with other aspect-oriented programming languages, such as JBoss and Spring aspect-oriented programming languages. Moreover, because the Java object-oriented computing environment is well understood and documented, many aspects of the invention have been described in terms of Java and Java-based concepts. However, the Java and Java-based concepts are used principally for ease of explanation. The invention is not limited to interactions with a Java object-oriented computing environment.

The invention in its broader aspects is therefore not limited to the specific details, representative apparatus and method, and illustrative example shown and described. Accordingly, departures may be made from such details without departing from the spirit or scope of Applicant's general inventive concept.

What is claimed is:

1. A method for managing access to a resource within an aspect-oriented environment, the method comprising:
during execution of an application at a thread, the thread within a container:
receiving a service context associated with the container at the thread, the service context enabling access to a resource by the thread, the resource is a server resources;
initializing other thread outside of the container to execute an aspect outside of the container, wherein the aspect is selected from a group consisting of an inter-type declaration, a pointcut, and an advice, and wherein the other thread does not initially have access to the resource upon being initialized; and
transmitting the service context associated with the container from the thread within the container to the other thread outside of the container to enable access to the resource by the other thread outside of the container.

2. The method of claim 1 wherein receiving the service context further comprises receiving a context code, wherein the context code comprises the service context.

3. The method of claim 1, further comprising executing the aspect asynchronously.

4. The method of claim 1, wherein execution of the application further comprises executing a base program within the container.

5. The method of claim 1, wherein initializing the other thread further comprises initializing the aspect using at least one of a programming language command, an XML configuration and a metadata annotation.

6. The method of claim 1, wherein initializing the other thread further comprises assigning the other thread to the aspect.

7. The method of claim 1, wherein transmitting the service context further comprises associating the aspect with a command code configured to enable transmission of a context code, wherein the context code comprises the service context.

8. The method of claim 1, wherein transmitting the service context further comprises identifying a command code configured to enable transmission of a context code, wherein the context code comprises the service context.

9. The method of claim 1, wherein transmitting the service context further comprises retrieving a context code, wherein the context code comprises the service context.

10. The method of claim 1, wherein the service context relates to at least one of a security service, a transaction service and a naming service associated with the container.

11. The method of claim 1, further comprising executing the aspect asynchronously, wherein the aspect is configured to establish the service context.

12. An apparatus, comprising:
a memory;
program code resident in the memory; and
a processor in communication with the memory and configured to execute the program code to execute an application at a thread, the thread within a container, wherein executing the application includes:
receiving a service context associated with the container at the thread, the service context enabling access to a resource by the thread, the resource is a server resources;
initializing other thread outside of the container to execute an aspect outside of the container, wherein the aspect is selected from a group consisting of an inter-type declaration, a pointcut, and an advice, and wherein the other thread does not have access to the resource upon being initialized; and
transmitting the service context associated with the container from the thread within the container to the other thread outside of the container to enable access to the resource by the other thread outside of the container.

13. The apparatus of claim 12, wherein receiving the service context further comprises receiving a context code, wherein the context code comprises the service context.

14. The apparatus of claim 12, wherein the aspect executes asynchronously.

15. The apparatus of claim 12, wherein the application comprises a base program within the container.

16. The apparatus of claim 12, wherein the aspect is initialized using at least one of a programming language command, an XML configuration and a metadata annotation.

17. The apparatus of claim 12, wherein the program code is further configured to identify a command code configured to enable transmission of a context code, the context code comprising the service context.

18. The apparatus of claim 12, wherein the program code is further configured to retrieve a context code from the container, wherein the context code comprises the service context.

19. The apparatus of claim 12, wherein the service context relates to at least one of a security service, a transaction service and a naming service associated with the container.

20. A method comprising:
 detecting a pointcut in an aspect program, the pointcut associated with one or more join points of the aspect program;
 identifying at least one join point in a base program that matches at least one of the one or more join points of the aspect program;
 automatically modifying the base program to initialize an aspect thread outside of the container;
 automatically modifying the base program to transmit a service context to the aspect thread;
 automatically modifying the aspect program to retrieve and establish the service context in the aspect thread; and
 executing the modified base program in an application at a thread within a container, wherein executing the modified base program includes:
  receiving the service context associated with the container at the thread, the service context enabling access to a resource by the thread;
  initializing the aspect thread outside of the container, the aspect thread executing the modified aspect program, wherein the aspect thread does not have access to the resource upon being initialized; and
  transmitting the service context to the aspect thread to enable access to the resource by the aspect thread, wherein the aspect thread retrieves and establishes the service context.

\* \* \* \* \*